June 9, 1931. G. T. VOORHEES 1,808,910
REFRIGERATING APPARATUS
Filed April 18, 1921 2 Sheets-Sheet 1
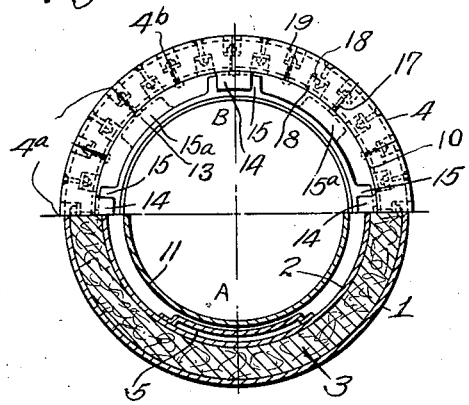
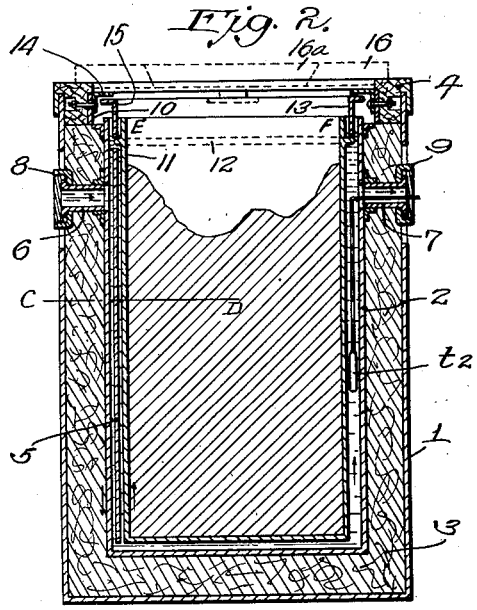
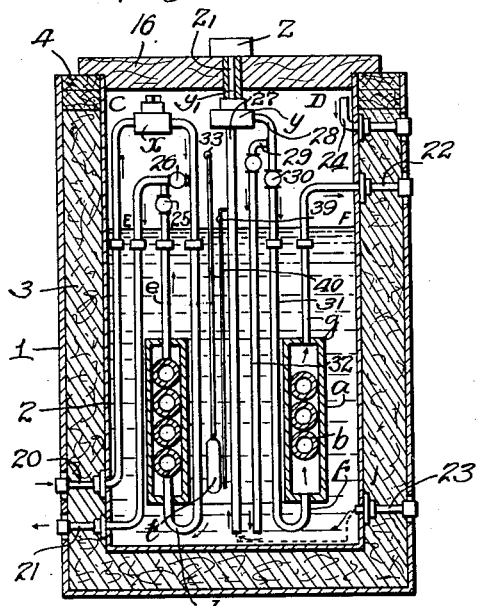
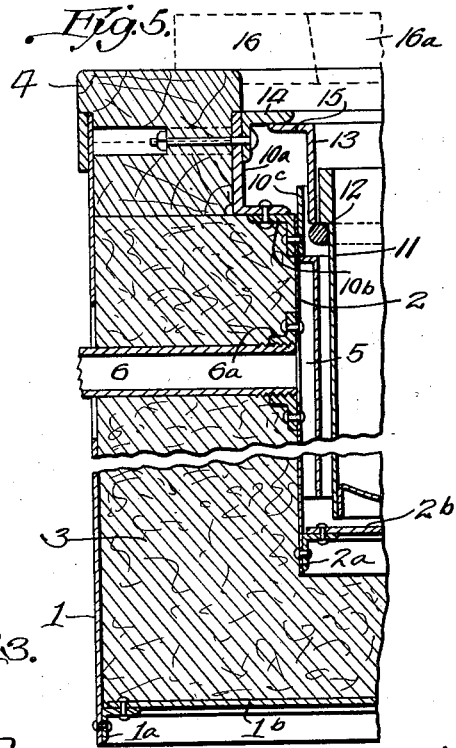
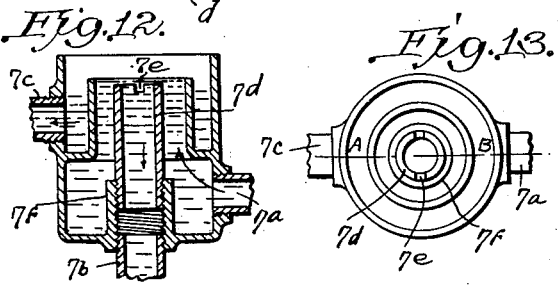
Inventor
Gardner T. Voorhees

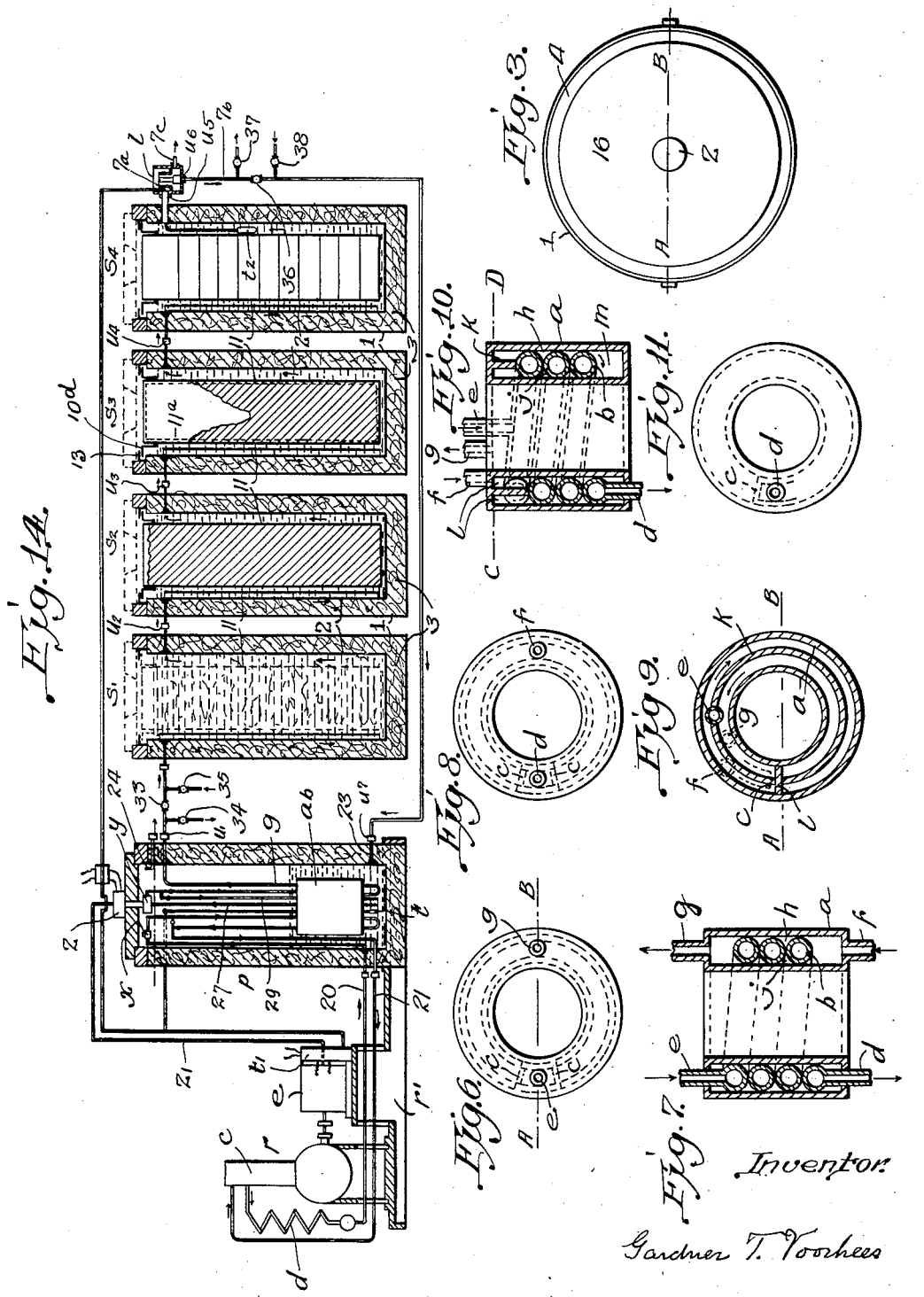

Patented June 9, 1931

1,808,910

UNITED STATES PATENT OFFICE

GARDNER TUFTS VOORHEES, OF BOSTON, MASSACHUSETTS

REFRIGERATING APPARATUS

Application filed April 18, 1921. Serial No. 462,283.

My invention relates to cooling processes and apparatus, particularly for maintaining ice cream in a frozen condition. Its objects are to make such process and apparatus effective and reliable and easy for commercial use, transportation and installation. It consists mainly of the necessary elements and their combination and their method of operation and regulation in conjunction with a refrigerating system that preferably uses a volatile liquid as a primary refrigerant and a secondary liquid, such, for example as brine, as a secondary refrigerant. The nature of the invention enables the secondary refrigerant to be cooled by the primary refrigerant and enables the primary refrigerant to be used and transported in a special apparatus also adapted to have circulated therein the secondary refrigerant. The secondary refrigerant having units of apparatus for containing it and the ice cream or substance to be cooled. All combined with means to automatically control the circulation of the quantity of the primary and secondary refrigerants and the temperatures thereof and to automatically control the starting and stopping of a refrigerating machine for the primary refrigerant.

In the drawings Figs. 1 and 2 diagrammatically show a secondary cooling element, Fig. 1 being a part plan of Fig. 2 and a part section, on line C D of Fig. 2. Fig. 2 being a sectional elevation on line A B of Fig. 1. Figs. 3 and 4 diagrammatically show a primary cooling element, Fig. 3 being a plan of Fig. 4 and Fig. 4 being a sectional elevation on line A B of Fig. 3. Fig. 5 is a part sectional elevation of the secondary cooling element of Figs. 1 and 2. Figs. 6, 7, 8 show a special form of brine cooler where Fig. 7 is a sectional elevation on line A B of Fig. 6, and Figs. 6 and 8 are plan views of Fig. 7. Figs. 9, 10, 11 show a modification of this special form of brine cooler where Fig. 10 is a sectional elevation on line A B of Fig. 9 and Fig. 9 is a sectional plan on line C D of Fig. 10, and Fig. 11 is a plan view of Fig. 10. Figs. 12 and 13 are a brine level regulating apparatus, Fig. 12 being a sectional elevation on line A B of Fig. 13 and Fig. 13 being a plan of Fig. 12.

Fig. 14 is a diagrammatic part sectional elevation of the primary and secondary cooling elements together with a refrigerating machine and various other apparatus.

In all the figures similar parts generally have like letters or numbers sometimes with different subscripts.

In Figs. 1 and 2, 1 is an outer shell of any desired material or shape but preferably of sheet metal and of cylindrical shape as there shown. 2 is an inner shell of any desired material or shape but preferably of sheet metal and of cylindrical shape as there shown. 3 is an insulation between casings 1 and 2. 4 is an insulating connection between casing 1 and an extension of casing 2. 5 is a brine conduit connecting the upper and lower portions of casing 2, said conduit may be of any desired shape or material but is here shown as a narrow annular conduit formed by a piece of sheet metal fixed to casing 2. 6, 7 are conduits connecting with casing 2 having any desired connecting means as half unions 8, 9. Conduits 6, 7 preferably conduct brine into passage 5 and out of the inside of casing 2 but could conduct brine in a reverse direction if so desired and passage 5 could be shortened or dispensed with if so desired. The secondary refrigerants level such as brine is maintained in any desired way in casing 2 preferably near its top as at E F.

Such a level controlling means is shown and will be described in connection with Figs. 12 and 13. $t_2$ is one end of a thermostat of any desired construction at any desired place in this secondary cooling element as for example, in the brine as there shown.

The upper part of casing 2 may be provided with extension 10. 11 is a container of any desired shape, or material, preferably of sheet metal and of cylindrical shape as there shown having a projection 12. Can 11 may contain any desired substance to be maintained cool such for example as ice cream either in bulk or in the form of bricks or it may be used to contain a cooling substance such as ice and salt or may be a cold reservoir, in which case it may contain any desired cold substance such as cold brine or any substance having latent heat of fusion at any desired melting point such for example as a solution of brine of such a strength, as will have a predetermined melting point. As shown, the space between casing 2 and can 11 is made narrow to reduce the outside dimensions of this apparatus, but if desired this space could be made wide enough to contain ice and salt and the outer casing 1 may be of any desired shape and may enclose several inner casings 2 and intermediate insulation 3 as will be clear to those skilled in the art. 13 is a holding down means, engaging projection 12 of can 11 and engaging lugs 14 preferably fixed to extension 10. 13 having lugs 15 which engage lugs 14 by revolving their position from that of 15a to that of 15 while pushing down on projection 12 of can 11. 16 is a cover of any desired shape or material preferably of insulation and preferably having a central cover 16a. 17 are screws having nuts 18 preferably set into recesses 19 from opposite faces of 4 to clamp casings 1 and extension 10 of case 2, to insulator 4. Insulator 4 being preferably made up of 2 layers of segments of wood 4a 4b that may be screwed or glued together.

The details of this construction are more clearly shown in Fig. 5, here 10 of Figs. 1 and 2 is composed of angles 10a 10b and piece 10c fixed to casing 2. 10c projecting to form a pocket to prevent drip from falling down into casing 2 and also forming a guide for holding down means 13. Conduit 6 being provided with a flange 6a attached to casing 2. Casing 1 having angle 1a and piece 1b fixed thereto to form its bottom and casing 2 having angle 2a and piece 2b fixed thereto to form its bottom.

In Figs. 6, 7, 8 a is a casing containing a pipe coil b closed at each end c and having conduits d e connected to said coil, preferably near its ends and having conduits f g connecting with casing a. A primary refrigerating fluid such, for example, as vaporizing ammonia may circulate through coil b either downwardly through e and out of d or in a reverse direction or through d and e with Fig. 7 in a horizontal position as shown. A fluid to be cooled may circulate through casing a as through inlet f and spiral spaces h j between casing a and coil b. This brine may flow in the reverse direction as in through g and out through f or the primary refrigerant may flow through shell a and the spiral spaces j h and the secondary refrigerant may flow through the coil b. In Figs. 6, 7, 8, the material flowing through shell a flows in parallel through the two spiral spaces h j. Shell a may be partly or entirely surrounded by insulation, or brine or both. A modification of Figs. 6, 7 and 8 is shown in Figs. 9, 10, 11 where the spiral spaces h j act in series by having the shell conduits f g so disposed as to form an inlet and an outlet to the casing a and where strip k and piece l prevent communication of the inner and outer spiral passages in casing a. Here if f were an inlet and g were an outlet then the fluid circulating in casing a would go down the spiral h to m and up the spiral j and out of g.

The primary cooling element of Figs. 3 and 4 has an outer shell 1 and an inner shell 2 and insulation 3 and connecting wooden piece 4 and cover 15 similar to those of Figs. 1 and 2. A brine cooler a b similar to that of Figs. 6, 7, 8 having coil b is shown inside of casing 2. $x$ is an automatic expansion valve of any desired kind, preferably of the type that maintains a pressure not to exceed a predetermined amount on its low pressure side. $y$ is a brine pump of any desired type actuated by any desired means as by motor $z$ having shaft $z_1$ engaging shaft $y_1$ of pump $y$. Shaft $z_1$ preferably slipping out of shaft $y_1$ when cover 16 is removed and shaft $y_1$ being preferably of an insulating material. $t$ is one end of a thermostat of any desired type as for example a bulb containing liquid $SO_2$ and having a tube 33. The primary cooling element of Figs. 3 and 4 is designed to be connected for transport and installation to a refrigerating machine by conduits 20 and 21 and to be connectable to the secondary cooling elements of Figs. 1 and 2 by conduits 22 and 23. Connections 20, 21, 22, 23 preferably terminating in means for handy connections such for example as half unions. Conduit 24 is for overflow. It is understood that brine cooler a b may be of any desired type or construction. The operation of the primary cooling element of Figs. 3 and 4 as shown, is as follows.

A primary refrigerant fluid such, for example as liquid ammonia enters through conduit 20 and flows past automatic expansion valve $x$ and from it via conduit d to coil b and from it via conduit e and conduit 21 to the refrigerating machine. Valves 25 and 26 can be used to pump out oil or residue in coil b by closing valve 25 and opening valve 26 and shutting off the supply of liquid to expansion valve $x$.

Brine from the secondary refrigerating elements enters through conduit 23 and is pumped via pipe 27 by pump $y$ and discharged through conduit 28 so that by the regulation of valves 29 and 30 any desired quantity of brine, up to the maximum capacity of pump $y$ may be discharged through pipe 31 and conduit f through the spiral spaces of brine cooler a b and out through conduit g and 22 to the secondary cooling elements. When pump $y$ is not pumping its maximum quantity its surplus is discharged through pipes 29, 32.

As the level of the brine may fluctuate in casing 2, overflow 24 is provided to dispose of it should it get above level C D. Should the refrigerating machine fail to function the brine in the primary cooling element of Figs. 3 and 4 may have cracked ice put into it to cool it.

In Figs. 12 and 13, $7a$ is an inlet and $7b$ is an outlet and $7c$ is an overflow. $7d$ is a stand pipe that may be raised or lowered by screwing it in or out of $7f$ by means $7e$ to maintain different levels of brine in a secondary element having brine connection $7a$ thereto.

In Fig. 14 $s_1$ $s_2$ $s_3$ $s_4$ are secondary cooling elements similar to that of Figs. 1 and 2 and $p$ is a primary cooling element similar to that of Figs. 3 and 4 and $l$ is a level controlling element similar to that of Figs. 12 and 13, and $a\ b$ is a brine cooler similar to that of Figs. 6, 7, 8 $x$ is an automatic expansion valve Y a brine pump and $t$ a thermostat all as described in connection with Figs. 3 and 4. $r$ is a refrigerating machine here shown as consisting of a compressor $c$ and a condenser $d$ driven by a motor $e$. Refrigerating machine $r$ could be replaced by any other desired type of refrigerating machine, where if it were an absorption machine, $e$ and $c$ would constitute a generator therefor. Motor $e$ can be electric as here shown or any other desired type of prime mover $t$, connects with thermostat bulb $t$ or $t^2$ and contains any desired means for starting and stopping motor $e$ or its equivalent, in case of an absorption machine. The equivalent of motor $e$ would be the heating means for the generator and might also be the liquor pump as will be clear to those skilled in the art without further description.

$s_1$ $s_2$ $s_3$ $s_4$ may all contain ice cream to be cooled in cans 11 or either $p$ or any of the secondary cooling elements as $s_1$ may have crushed ice and salt therein, either directly in casing 2 or in can 11 or any can 11 may have cold brine therein, or a frozen brine therein, as for example at $s_2$. Any can 11 may have bricks of ice cream therein as shown at $s_4$. As shown in Fig. 14 the refrigerating machine $r$ motor $e$ thermostat $t_1$ and primary cooling element $p$ are all mounted on a base $r_1$. This outfit is preferably charged with primary refrigerant and is disconnected from secondary cooling elements $s_1$ $s_2$ $s_3$ $s_4$ for shipment and installation. The secondary cooling elements $s_1$ $s_2$ $s_3$ $s_4$ are preferably separately shipped and installed and connected by unions $u_1$ $u_2$ $u_3$ $u_4$ $u_5$ $u_6$ $u_7$ to include the brine levelling element $l$. The preferred method of operation is as follows, liquid ammonia flows from condenser $d$ via pipe 20 and expansion valve $x$ to brine cooler $a\ b$ and from it via pipe 21 to compressor $c$. The compressor is actuated by motor $e$ which is alternately started and stopped by means of thermostat $t\ t$, or $t_2\ t_1$ by predetermined desired high and low temperatures at $t$ or $t_2$. Pump $y$ being actuated by motor $z$ or by a flexible shaft as $z_1$ or its equivalent from motor $e$ or if so desired pump $y$ could be actuated part of the time by motor $z$ and part of the time by flexible shaft $z_1$ in which case motor $z$ would preferably be automatically controlled to start and stop by conjunction with $t_1$, preferably having flexible shaft $z_1$ actuate the pump $y$ when motor $e$ was running and having motor $z$ actuate pump $y$ when motor $e$ was not running.

The brine in $p$ being cooled by the action of brine cooler $a\ b$ and being pumped from $p$ through $a\ b$ and out through $g$ and then preferably seriatum through the secondary cooling elements $s_1$ $s_2$ $s_3$ $s_4$ and out through levelling element $b$ where any surplus could overflow through outlet $7c$ or all could flow through outlet $7b$ back through pipe 23 to primary cooling element $p$.

It is obvious that when a can 11 is removed from casing 2 that the brine level in casing 2 will be lowered and consequently, with pump $y$ in operation the brine level in $p$ will also be lowered and when can 11 is replaced in casing 2 the brine level in $p$ will be raised again. Some or all of the cans 11 could as in $s_3$ be fixed to casing 2 by extensions $10d$, then holding down means 13 could be dispensed with and if $s_1$ $s_2$ $s_3$ $s_4$ were all equipped with $10d$ like $s_3$ then levelling means $l$ could be dispensed with and a conduit could run directly from union $w_5$ via $7b$ to union $w_7$. If so desired one extra can $11a$ could be placed in each of cans 11 as in $s_3$ and the space between can 11 and $11a$ could be filled with any suitable liquid to insure good thermal contact between 11 and $11a$ and to prevent moisture from freezing them together. It is evident that $s_1$ $s_2$ $s_3$ $s_4$ could be on the same level as $p$ as shown or at a higher level with levelling means $l$ in use or could be on a lower level with cans provided with closed brine circuits by $10d$ as in $s_3$. If so desired pipe 23 could connect directly to the bottoms of pipes 27, 29 for use when the secondary refrigerators were at a lower level than that of $p$, in which case, if there were any brine in $p$ it would be stagnant, or see Fig. 4, if pipe 23 were connected to pipe 27 and regulating valve 39 and conduit 40 were provided, then, brine discharged through pipe 32, could be drawn in through pipe 40, or many other variations of the flow and control of brine could be provided for as will be clear to those skilled in the art.

It is further evident that the brine from $g$ could circulate in parallel through $s_1$ $s_2$ $s_3$ $s_4$ by connecting all of the inlets 6 of Fig. 2 to $g$ and connecting all of the outlets 7 of Fig. 2 to $l$ or to $7b$.

If so desired some of this brine so circulated could by regulation of valves 33, 34, 35 or 36, 37, 38 be used for any desired supplemental cooling and all pipes may be insulated as will be clear to those skilled in the art without further description. If the refrigerating machine $r$ were out of order and if element $s_2$ had cold brine or frozen brine in can 11 this store of refrigeration could be drawn on for maintaining the other secondary elements in a cool condition. Or if the refrigerating machine $r$ were out of commission for a considerable period then cracked ice could be supplied from time to time in $p$ or $s_1$ or both and the resultant ice meltage thrown away through overflows $7c$ or 24 or both.

Owing to the intimate relation of this process and apparatus and the intimate relations of the different elements of the apparatus and the specific individual relation of each element to the whole, I desire to claim all collectively and separately in the broadest possible manner.

What I claim is:

1. In a secondary refrigerator the combination of two concentric metallic cups and an insulating ring between and fixed to and joining their open upper ends, insulation between their opposed surfaces, a detachable brine conduit to and a detachable brine conduit from the inner cup.

2. In a secondary refrigerator the combination of two concentric metallic cups and an insulating ring between and fixed to and joining their open upper ends, insulation between their opposed surfaces, a detachable brine conduit for the upper portion of the inner cup and a detachable brine conduit for the lower portion of the inner cup.

3. In a secondary refrigerator the combination of three concentric metallic cups and an insulating ring between and fixed to and joining the open upper ends of the two outer cups, insulation between the opposed surfaces of the two outer cups, two detachable brine conduits for the middle cup the inner cup being removable from the middle cup.

4. In a secondary refrigerator the combination of three concentric metallic cups and an insulating ring between and fixed to and joining the open upper ends of the two outer cups, insulation between the opposed surfaces of the two outer cups, two detachable brine conduits for the middle cup the inner cup being removably fixed in the middle cup.

5. In a secondary refrigerator the combination of two concentric metallic cups each open at its upper end the inner cup having an outwardly and upwardly extending extension near its top an insulating ring outside of and joining said extension to the inside of the outer cup at its top, insulation between the opposed surfaces of said cups, two detachable brine conduits for the inner cup.

6. The combination, with one or more secondary refrigerators, of a brine cooler, having an insulated casing, having a brine inlet and outlet and a refrigerant inlet and outlet therethrough and a pump therefor, a conduit from the inside of the casing to the pump, a conduit from the pump to the brine cooler, a conduit from the brine cooler to the brine outlet, a conduit from the refrigerant inlet to the brine cooler and a conduit from the brine cooler to the refrigerant outlet.

7. An ice cream refrigerating apparatus comprising a primary refrigerator, having means for cooling brine therein, a plurality of secondary refrigerators each adapted for receiving and cooling an ice cream can therein, detachable pipe connections between the secondary refrigerators and the primary refrigerator, means for circulating brine from the primary refrigerator through the secondary refrigerators and back again, thermostatic means for controlling the brine circulation, and means for controlling the brine cooling means.

8. In a refrigerating cabinet system, the combination of a main brine tank, a cabinet separate from said tank and fitted with an auxiliary brine tank and a food chamber extending into said tank and surrounded by the brine therein, means including a pump for circulating brine from the main tank to the auxiliary tank and back again to the main tank, an electric motor for driving the pump, electrically driven refrigerating apparatus operable independently of said pump motor and comprising an evaporator immersed in the brine in the main tank and a gas liquefier connected with the evaporator, and means responsive to the temperature of the brine in the main tank for starting and stopping the operation of said liquefier and starting and stopping said pump motor.

9. A refrigerated cabinet for food and the like comprising in combination a brine tank having a food chamber extending into it, means for circulating brine in the tank, a motor for driving said circulating means, refrigeration apparatus operable independently of said motor comprising an evaporator immersed in said second brine of a second tank and a gas liquefier connected with the evaporator, and means responsive to the temperature of the brine in the tank for starting and stopping the operation of said liquefier and starting and stopping the motor of said brine circulator.

GARDNER TUFTS VOORHEES.